Oct. 28, 1941.  T. R. NICHOLS ET AL  2,260,787
HOLDER
Filed April 10, 1939

Theodore R. Nichols
Clyde J. Ringer
INVENTOR

ATTORNEY

Patented Oct. 28, 1941

2,260,787

UNITED STATES PATENT OFFICE 2,260,787

HOLDER

Theodore R. Nichols and Clyde J. Ringer, Emsworth, Pa.

Application April 10, 1939, Serial No. 267,144

3 Claims. (Cl. 248—39)

The invention relates to an ornament holder and more especially to a display holder for use on motor vehicles or the like.

The primary object of the invention is the provision of a holder of this character, wherein the body thereof is socketed for separable attachment thereto of display gadgets, for example, flags, images or ornaments of varying descriptions, such as an insignia or the like, the body being susceptible of detachable mounting upon a motor vehicle and has associated therewith suction cups for this purpose and also is braced in a novel manner to avoid displacement when subjected to wind currents in its use on the vehicle.

Another object of the invention is the provision of a holder of this character, wherein the gadgets can be conveniently arranged, interchanged or otherwise distributed for proper display when in an attached position, the body of the holder including its brace being capable of proper mounting at various localities upon the vehicle, the brace being adjustable to assure correct and staple support for the holder in its mounted position.

A further object of the invention is the provision of a holder of this character wherein the structure thereof is novel in its entirety.

A still further object of the invention is the provision of a holder of this character which is simple in its construction, thoroughly reliable and efficient in operation, neat in appearance, being strong, pliable, readily and easily removably positioned for use, and inexpensive to manufacture.

With these and other objects in view the invention consists in the features of construction, combination and arrangement of parts as will be hereinafter fully described in detail, illustrated in the accompanying drawing which discloses the preferred and modified embodiments of the invention and pointed out in the claims hereunto appended.

In the accompanying drawing.

Similar reference characters indicate corresponding parts throughout the several views in the drawing.

Figure 1:
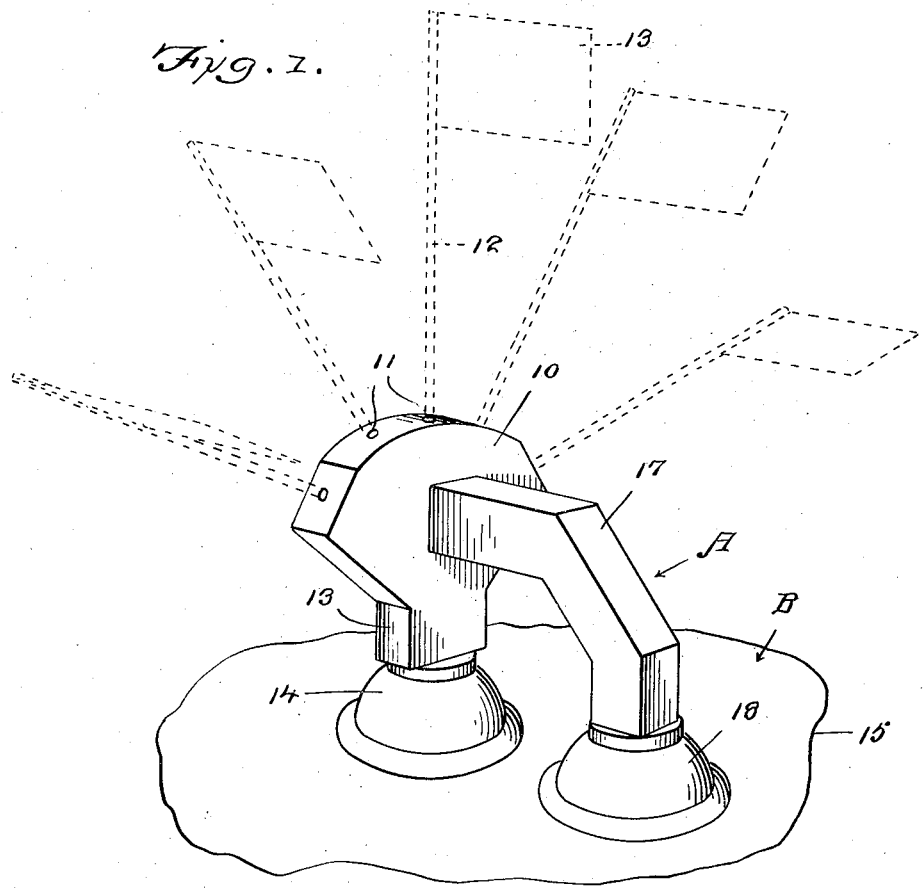
Figure 1 is a perspective view of the holder constructed in accordance with the invention and applied to a vehicle for display purposes.
Figure 2:
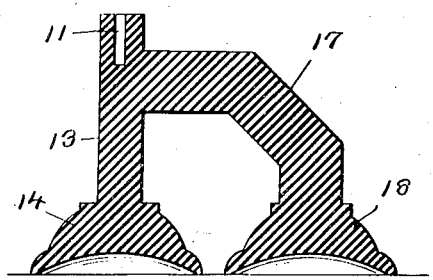
Figure 2 is a fragmentary vertical sectional view thereof.

Referring to the drawing in detail, A denotes generally the holder constructed in accordance with the invention and B a portion of a motor vehicle, on which it is separably mounted. The holder A comprises a substantially segmental shaped body 10, preferably, made from rubber vulcanized having in its top upwardly arched edge, a plurality of circular sockets 11 opening therethrough for the detachable coupling of a gadget or a number of gadgets, for example, the staff 12 of a display flag 13, the staff 12 being frictionally held engaged in the selected socket therefore. It is to be understood that ornaments (not shown) or the like can be dowel coupled with the body within a selected socket therein, similarly to the socketed staff of the flag.

The body 10 at its lower portion 13 which is contracted to present a stem or upright has united therewith a suction cup 14 for the fastening of said body to a flattened surface, as for example, the hood 15 of the vehicle B, the cup being anchored at 16 which is embedded in the lower portion 13, although this cup may be integrally formed with the body.

Extending from one flat side of the body 10 is an outwardly and downwardly directed yieldable brace or leg 17, preferably integral with said body, although it may be separably joined therewith and is susceptible of distortion to a limited degree for proper positioning thereof. This leg 17 at its lower end is fitted with a suction cup 18 which may be anchored thereto as at 19 or integral with said end, so that the brace or leg will have separable fastening to a flattened support or the hood of the vehicle. This distortion of the brace or leg enables the cup 18 to attach itself to the area presented by the support or hood according to the lay of the same relative to the lay of the area where the cup 14 attaches. This leg or brace sustains the holder upright and rigid against wind currents when worn on a vehicle at the selected point thereof.

Figure 3:
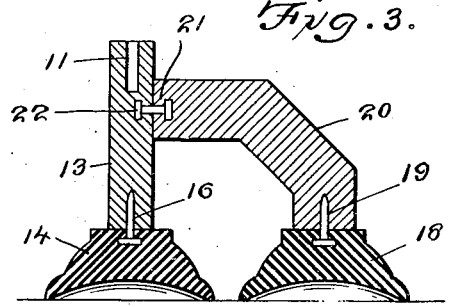
Figure 3 is a view similar to Figure 2 showing a modification.

In Figure 3 of the drawing, there is shown a slight modification of the invention, wherein the leg or brace 20 is in itself rigid and is swiveled to the body 21 by a suitable coupling 22 for the turning of said leg relative to the body in the desired mounting of the holder as for example, the body and the said leg or brace may be connected to a support having planes or areas at substantially right angles to each other.

The holder in its formation is ornamental and enables the separable maintenance of gadgets or ornaments in display position in association with the holder.

What is claimed is:

1. A holder of the character described, comprising a main body having a socket opening through one side thereof for separable frictionally holding a gadget when engaged therein, a brace projecting from and turnable laterally relative to said body and having its outermost end terminating in substantially the same plane of the lowermost portion of the said body, and suction cups on the body and brace, respectively.

2. A holder of the character described comprising a main body having sockets opening through one edge for separable frictionally holding gadgets when engaged therein, a laterally turnable brace projecting from the body, suction cups associated with the body and brace, respectively, and means swiveling the brace to the body.

3. A holder of the character described comprising a main body having sockets opening through one edge for separable frictionally holding gadgets when engaged therein, a laterally turnable brace projecting from the body, suction cups associated with the body and brace, the body being of substantially sector shape with its larger portion uppermost and means swiveling the brace to the body, the sockets opening through the uppermost edge of the body.

THEODORE R. NICHOLS.
CLYDE J. RINGER.